United States Patent [19]

Tomalia et al.

[11] 3,723,451

[45] Mar. 27, 1973

[54] B1-2-OXAZOLINE AND OXAZINE ETHERS AND THIOETHERS

[75] Inventors: Donald A. Tomalia; Janet N. Paige, both of Midland, Mich.

[73] Assignee: The Dow Chemical Company, Midland, Mich.

[22] Filed: Sept. 29, 1970

[21] Appl. No.: 76,598

Related U.S. Application Data

[62] Division of Ser. No. 834,611, June 16, 1969, Pat. No. 3,563,920.

[52] U.S. Cl.........260/307 F, 260/240 R, 260/240 D, 260/246 R
[51] Int. Cl. .............................................C07d 85/36
[58] Field of Search ............260/307 F, 246 R, 240 R

[56] References Cited

UNITED STATES PATENTS 3,493,575   2/1970   Tomalia ..............................260/268

*Primary Examiner*—Donald G. Daus
*Assistant Examiner*—R. V. Rush
*Attorney*—Griswold & Burdick and Albin R. Lindstrom

[57] ABSTRACT

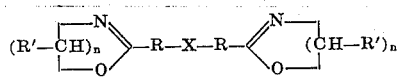

Wherein R is alkylene, phenylene, vinylene, or phenylene-alkylene, wherein, "alkylene" alone or in a combined name, designates an alkylene moiety that is of from one to 10 carbon atoms, and X is —S— or —O—; $n$ is zero or 1; optionally also with an oxazoline as comonomer, are cationically polymerized to polymers containing recurring units of the formula

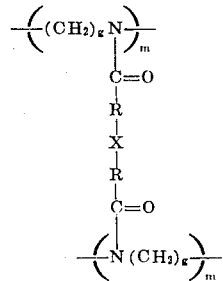

and, optionally, also units of the formula

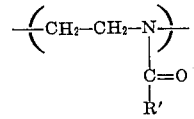

wherein $g$ is an integer 2 or 3, $m$ represents the degree of polymerization, and R' is hydrogen or a specified radical.

5 Claims, No Drawings

B1-2-OXAZOLINE AND OXAZINE ETHERS AND THIOETHERS

RELATIONSHIP TO OTHER APPLICATIONS

The present specification and claims constitute a divisional application from copending application Ser. No. 834,611, filed June 16, 1969, now U.S. Pat. 3,563,920.

BACKGROUND OF THE INVENTION

1. Field of the Invention

This invention is concerned with organic heterocyclic chemistry, and is more particularly directed to heterocyclic compounds, and compounds or compositions comprising or prepared from such compounds wherein the heterocyclic ring moiety is a 2-oxazoline (five-membered ring) or a 5,6-dihydro-4H-1,3-oxazine, (six-membered ring); and methods of using such compounds.

2. The Prior Art

The apparently closest prior art is U. S. Pat. 2,924,571 in which there is reported the preparation of various 2,2'-alkylene bis-2-oxazolines by the azeotroping of water from a mixture of dicarboxylic acid and amino ethanol. The present inventors have reinvestigated the work set forth in the said patent and have found that while the processes there set forth, employing the stated starting materials, lead to products having (so far as the present inventors know) at least some and probably all the useful properties imputed to them, nevertheless, the structures and names assigned to the supposed products of the patent are consistently erroneous. One reading the patent would believe himself led to the preparation of an alkylene bisoxazoline compound, whereas, in fact, following the procedures of the patent one obtains, at best, a mixture of 2-hydroxyethyl amide and certain polyesteramide substances. The patent does not enable the preparation of any oxazoline. Recognizing the significance of their imputation of error, the present applicants have scrupulously verified, and have proved, the error in the prior art patent.

Kagiya and co-workers (4 Polymer Letters 257) (1966) have reported the preparation of 2,2'-alkylene or p-arylene bis-2-oxazolines by the reaction of 1,1'-alkylene or arylene-dicarbonyl bisdiaziridines with acetonitrile in the presence of sodium iodide.

Various monooxazoline compounds have been shown to be capable of homopolymerization under such influence as catalytic boron trifluoride: see Tomalia et al., 4 Journal of Polymer Science, 2253 (1966). W. Seeliger, et al., Edit, 5 Angew. Chem. Internat., 875 (1966). Synthetic routes have been summarized by Wiley et al., 44 Chem. Revs., 447–475. Other recent synthetic developments as well as various polymerizations are reported by Seeliger et al., Edit., 5 Angew. Chem. Internat. 875 (1966).

DESCRIPTION OF THE PRESENT INVENTION

The present invention provides biheterocyclic ether compounds in which the heterocyclic rings are of five or six ring atoms and are represented, generically, by the formula

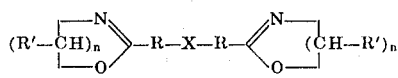

wherein R is alkylene, phenylene, vinylene, or phenylene-alkylene, wherein, "alkylene" alone or in a combined name, designates an alkylene moiety that is of from one to 10 carbon atoms, and X is —S— or —O—; n is zero or 1; the foregoing useful as pesticides, corrosion inhibitors, and as starting materials to be quaternized in the preparation of cation active finishing agents; also as monomers, latent epoxy curing agents; also, the invention resides in part in resins comprising and the homopolymers of, such substances with their identities or their copolymers with other related substances of this invention.

Such homopolymer is polymeric resin of recurring units of the formula

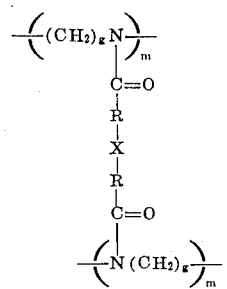

wherein g is an integer, 2 or 3, wherein R is alkylene, phenylene, vinylene, or phenylenealkylene, wherein, "alkylene" alone or in a combined name, designates an O— moiety that is of from one to 10 carbon atoms, and X is —S— or —O— and m represents the degree of polymerization.

When a less highly cross-linked resin is desired, a portion of the polymerizable mixture can be a monooxazoline or monooxazine of the formula

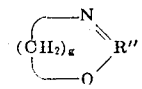

wherein R'' is lower alkyl of from one to 10, both inclusive, carbon atoms; cycloalkyl of from three to six, both inclusive, carbon atoms; lower alkenyl or lower alkadienyl or lower alkatrienyl of from one to 10, both inclusive, carbon atoms; lower alkoxy of from one to 10, both inclusive, carbon atoms; lower alkylol of from one to 10, both inclusive, carbon atoms; nitro, furyl, fluoro, chloro, bromo, iodo, trifluoromethyl, chloroloweralkyl or bromoloweralkyl of n carbon atoms and from 1 to $2n+1$ halogens, n being from 1 to 10, both inclusive; also alkyloxyalkyl and alkylthioalkyl in either of which any alkyl is of from one to 10, both inclusive, carbon atoms; loweralkylthio of from one to 10, both inclusive, carbon atoms; phenyl, substituted phenyl in which a substituent upon such substituted phenyl is from those above designated there being from 1 to five of such substituents upon said phenyl; and various other moieties not here named.

In the statement of certain individual chemical substances that follows, the abbreviation "mm." uniformly means, "millimeters mercury, pressure, absolute" and is used in conjunction with a number designating the pressure in the indicated units; similarly, various refractive index values are given; they are uniformly to be understood as the refractive index for the D-line of sodium light, and to have been taken with sample and refractometer at a temperature which is, in each instance, specified.

Among the specific oxazine compounds to be used, each of them being understood, as hereinbefore stated, to be a 5,6-dihydro-4-H-1,3-oxazine, are 2-vinyloxazine, a colorless liquid boiling at 50°–59°C. at 20 mm.; 6-methyl 6-phenyl-2-vinyloxazine, boiling at 86°–86.5°C. under 0.5 mm.; 6-methyl-2-(2-piperidinoethyl)-6-vinyloxazine, boiling at 86°–89°C. under 0.02 mm.; 6-methyl-2,6-divinyloxazine boiling at 84°–85°C. under 20 mm.; 2-methyloxazine, a colorless liquid boiling at 76°–79C. under 35 mm.; and the corresponding 2-isopropenyloxazoline also a liquid boiling at 81°–83°C. under 35 mm.; and the numerous oxazines in the prior art as in the Feinauer et al. articles mentioned.

Among the oxazoline compounds to be employed are 2-methyloxazoline, a colorless liquid with a refractive index at 22°C. of 1.4332; less advantageously, the 2,4-dimethyl oxazoline boiling at 111.5°–112°C. under 748 mm.; 2-ethyloxazoline, colorless liquid with refractive index at 20°C. of 1.4370; 2,5-dimethyloxazoline; less advantageously, 4,5-dimethyl-2-vinyloxazoline, boiling at 65°–66°C. under 35 mm.; 2-propyloxazoline, an article of commerce melting at 148°C.; 2-cyclopropyloxazoline boiling at 66°–67°C. under 22 mm.; 2-vinyloxazoline melting at 56.6°–57°C. under 50 mm.; 4-methyl-2-vinyloxazoline boiling at 53.5°–56°C. under 35 mm.; and preferably to the foregoing, 5-methyl-2-vinyloxazoline boiling at 57° under 35 mm.; also usually disadvantageously, 4,4-dimethyl-2-vinyl or -2-isopropenyloxazoline of U. S. Pat. No. 2,831,858; 2-isopropenyl-2-oxazoline boiling at 63°–64°C. at 35 mm. and found at 5 Angew. Chem. Internat. Edit. Vol. 5, 1966, p. 10, a compound conveniently stored under refrigeration; also 2-isopropenyl-4,5-dimethyloxazoline boiling at 81°C. under 75 mm.; 5-decyl-2-vinyloxazoline boiling at 50°C. under pressure equivalent to that of 12–17 microns of mercury, absolute; 2-ethoxyoxazoline, boiling at 95°–96°C. under 100 mm.; the commercial product 2,4-dimethyl-4-methanoloxazoline; also 2-ethoxy-2-oxazoline; also 2-(2-methoxy-1-methylethyl) oxazoline boiling at 85.5° –86°C. at 19 mm.; also 2-(2-(hexyloxy)ethyl)oxazoline boiling at 94°–95C. at 2.5 mm.; and 2-(ethylthio)oxazoline boiling at 81°–89°C. at 5 mm.; also, 2-(2-(butylthio)-1-methylethyl)oxazoline, boiling at 96°–97°C. at 0.8 mm.; 2-(1-methyl-2-(octylthio)ethyl)oxazoline boiling at 145°C. under 1.2 mm.; also 2-(1-methyl-2-(dodecylthio)ethyl)oxazoline; also 2-(dichloromethyl)oxazoline and 2-(trichloromethyl) oxazoline, the latter boiling at 101°–105°C. under 20 mm.; similarly 2-(1,1-dichloroethyl) and 2-(1,1-dichloropropyl) oxazoline, the latter boiling at 63°–67°C. at 0.06 mm. and also 2-(1,1,3-trichloropropyl)oxazoline which is a yellow liquid at room temperature; also 2-(2-furyl)oxazoline melting at 78°–81°C. from white crystals; and 2-phenyloxazoline boiling at 119°–120°C. at 16.5 mm.; and closely related to the foregoing, 2-(m-tolyl)oxazoline and 2-(p-tolyl)oxazoline, the latter melting at 67°–70°C.; also 5-methyl-2-phenyl oxazoline boiling at 121°–122°C. under 15 mm.; and 2-(p-methoxyphenyl)oxazoline; 2-(p-chlorophenyl) oxazoline melting at 75°–79°C., and its o and m isomers; 2-p-fluorophenyloxazoline, melting from white, glistening crystals at 61°–64°C.; 2-(m-bromophenyl)oxazoline melting at 35°–40°C.; and its 2-(p-bromophenyl isomer; also the m, p, and o-2-α,α,α-trifluorotolyl)oxazolines; 2-(p-nitrophenyl)oxazoline and its m and o isomers; 2-styryl oxazoline melting at 53°–56C.; 5,5-dimethyl-2-(3,4-xylyl)oxazoline boiling at 120°–123°C. at 0.5 mm.; also 2-(3,4-dimethoxyphenyl)-oxazoline melting at 64°–65°C.; and 5,5-dimethyl-2-(3,4,5-trimethoxyphenyl)oxazoline, melting at 85°–87°with at least incipient decomposition; and less advantageously, 4,4-dimethyl-2-(3,4,5-trimethoxyphenyl)oxazoline melting at 90°–91°C.; and also, 2-(p-methoxyphenyl)-5-phenyl oxazoline melting at 63°–65°C.; and 2-((3,4-dichlorophenoxy) methyl)oxazoline melting at 74°–76°C., as well as many others in the prior art as represented in the synopsis by Wiley and Bennett at 44 Chemical Reviews 447 and following, (1949) here incorporated by reference.

The invention embraces also epoxy resins cured by reaction of a curable polyepoxide with a difunctional compound of this invention; and also compositions comprising essentially a compound of this invention in an agriculturally efficacious excipient for an agriculturally useful chemical.

DETAILED DESCRIPTION OF THE INSTANT INVENTION

In the compounds according to this invention, R can be alkylene in the sense of a radical of the alkyl type doubly terminated into the instant structure; by one terminus bonded to the heterocyclic ring, and by the other terminus to the chalcogen, oxygen or sulfur. Representative such moieties include methylene, ethylene in the sense —CH$_2$CH$_2$—, propylene (methylethylene), trimethylene and the like up to and including the isomeric decylenes that are of 10 carbon atoms each.

Similarly, when the moiety —R— is phenylene, it is to be understood as representing a phenyl ring otherwise unsubstituted, from which two bonds proceed, one of them to the chalcogen —X— and the other to the number 2 carbon atom of the heterocyclic ring. The positions relative to each other, of these bonds on the aromatic ring may be ortho, meta, or para.

The moiety —R— can also be vinylene in the sense of a two-carbon moiety in which the carbons are doubly bonded together, each carbon having also a single bond by which it is bound into the instant molecule, and having also one hydrogen.

The moiety R can also be phenylenealkylene, by which is designated a group presenting a phenyl ring bonded at one extremity with the chalcogen, which here is oxygen or sulfur; and from another site on the ring, through any position of an alkyl substituent, bonded by the alkyl substituent to the oxazoline moiety. The alkyl substituent can be positioned ortho, meta, or para on the phenyl ring with respect to the chalcogen; can be linear or branched, and can be of from one to 10, both inclusive, carbon atoms.

A compound of this invention is of extraordinary value as a curing agent to be employed in reaction with a 1,2-polyepoxide that is curable to obtain an epoxy resin. In such application, the curing reaction that occurs is a reaction between, on the one hand, a heterocyclic ring, two of which characterize each molecule of a compound of this invention, and, on the other hand, the oxirane rings that are always characteristic of the polyepoxide. Inasmuch as each compound of this invention contains an average of two such heterocyclic rings, any compound of this invention can be thus employed. Further, inasmuch as each curable polyepoxide contains an average of at least somewhat more than one and typically two or more oxirane rings per molecule, and since it is the reactivity of the oxirane ring that leads to the production of a cured epoxy resin, any curable polyepoxide can be employed. This versatility is not extraordinary, since most agents which are capable of curing any polyepoxide to obtain an epoxy resin cure any other about equally well.

More particularly, the polyepoxides, the curing of which is contemplated according to the present invention, include the polyglycidyl ethers of the various bisphenols, which are the most important of the numerous polyepoxides. Other polyepoxides to be cured according to this invention are the polyglycidyl ethers of the halogenated, and, typically, the brominated bisphenols. Similarly, the epoxylated novolaks and the brominated epoxylated novolaks are curable with compounds of this invention. Further substances also curable include the polyepoxides derived from the at least terminal epoxylation of polyglycol chains. In similar manner, other curable polyepoxides, the curability of which pertains to the presence in the molecule of the said epoxide of more oxirane rings than one, average, can all be cured by the use of the instant compounds therewith.

It is unusual that the compounds of this invention, when mixed with a polyepoxide and permitted to stand, intimately mixed and probably mutually dissolved, with no tendency to separate or to segregate, comprise a mixture which remains latent and unreactive at ordinary ambient temperatures for long periods of time. This permits, by the use of the compounds of this invention as epoxy curing agents, the preparation of the long-desired, curable polyepoxide ready mixed with reactive curing agent, but latent for an exaggerated duration of time interval.

In view of the remarks, foregoing, it is pointed out that when one oxazoline ring as of a compound of this invention reacts with one oxirane ring as of a polyepoxide, there is obtained a ring-fusion product of which the fused ring portion is a tetrahydrooxazolooxazole moiety of the formula

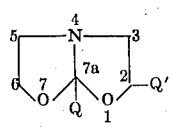

in which Q is a residue of a substituent, if any, formerly on the 2-position of a 2-oxazoline starting material and Q' is a residue of a substituent, if any, formerly on a carbon atom of an oxirane ("epoxy") starting material; such substance is a highly active catalytic curing agent to cure a polyepoxide to obtain an epoxy resin. The oxazines produce similar but asymmetric condensation biheterocyclic products. The initial condensation reaction between the two heterocyclic compounds takes place, at a significant rate, only at temperatures above about 100° and preferably above about 150°C; but once the said condensation product exists in even small, catalytic amounts, further heating of an oxazoline-polyepoxide mixture is optional and may be used, if desired, to effect more rapid cure of the polyepoxide than would take place at room temperatures. Moreover, a compound containing the above-depicted double fused ring structure can, if desired, be prepared in advance and isolated from a reaction mixture in which prepared, and thus separately supplied to a curable polyepoxide or mixture comprising the same, whereby to act as a catalytic curing agent.

While said curing agent is readily prepared from a dioxazoline compound and a polyepoxide, efficacious such catalytic compounds are obtained by reaction of a monoepoxide and a monooxazoline compound, and, as catalytic curing agent to cure a polyepoxide to obtain an epoxy resin, such reaction product of a mono-ring compound is comprehended within this invention.

Also, the cured epoxy resins in which cure is effected by reaction with a property-affecting amount of a compound of this invention manifest unique and useful properties of adhesivity, strength, flexibility to resist impact fracture, and freedom from striae such as are sometimes derived from reactive curing agents; in view of their unexpectedly advantageous properties, epoxy resins cured by reaction with compounds of this invention are aspects of the present invention.

Beyond the curing of polyepoxides to obtain cured epoxy resins, however, the instant compositions can be caused to homopolymerize. As is true in the occurrence of most homopolymerizations, a compound of this invention can also be made to co-polymerize with another embodiment of this invention that is not an identity. Thus, an oxazoline compound of this invention can co-polymerize with an oxazine compound of this invention, to obtain a substance all components of which are within the invention but which is, strictly speaking, a co-polymer. Similarly, one oxazine compound of this invention can co-polymerize with another compound of this invention that is an oxazine compound but different.

Restating the same concept, a homopolymer may be prepared, as hereinafter more fully set forth, from a mixture of substances of which each is a member of the genus embracing the instant compounds.

Furthermore, as is also commonly the experience of polymer chemists, when polymerizing a compound of this invention, it is often convenient to co-polymerize it with any of a wide range of co-polymerizable substances clearly outside the scope of the compounds of this invention. These various polymeric aspects are also regarded as aspects of the present invention.

PREPARATION OF THE PRESENT COMPOUNDS

The oxazoline and oxazine compounds of this invention are all easily produced by any of a group of synthetic routes all of which pass, advantageously, through a cyano group; in the sense that, at each molecular site where an oxazine or oxazoline heterocycle is desired, there is provided as a precursor site, a cyano. From such site it is, in general, convenient and easy to go on to the desired heterocycle. The only condition believed to be limiting at this juncture is that, with respect to the reactions that go on from the cyano to the heterocycle, preferably the cyano be the most reactive or only significantly reactive site; or, if any other site on the starting cyano compound be more reactive than cyano, then known alternative procedures must be considered.

It is not difficult, and in the laboratory work carried out in the completion of the instant invention, it has become routine, to prepare the instant compounds with elegance and high purity. However, it is pointed out that for at least their reactivity as monomers and co-monomers and curing agents, such elegance is not required. Mixed starting materials can be used to give mixed products all within the single class, or genus, of such compounds as hereinbefore set forth, and all will function as indicated. Stoichiometry of starting materials can be permitted to vary in such fashion that substantially more, or somewhat fewer, average, oxazine or oxazoline heterocycles appear, per molecule, than precisely two as above indicated; and for at least their reactivity as monomers and co-monomers and curing agents, all will function as indicated. Similarly, the position isomery of substituents (but not within the nuclear structure of the oxazine or oxazoline moieties) may vary widely without impairing the products of this invention.

Many synthetic routes are known by which to provide reactive cyano sites as desired.

As illustrative, when R is an aromatic nucleus, so that —R—X—R— is a phenyl ether or sulfide nucleus, such starting material can be caused to react with formaldehyde in the presence of hydrochloric acid, to obtain a ring-chloromethylated product. Ring isomery may be controlled, or ignored. This product can then be caused to react with potassium cyanide in a routine metathesis to obtain cyano sites replacing the α-chlorine upon the chloromethylated sites. From such cyano sites, further synthesis of the instant oxazolines and oxazines is routine, as is shown below. It is not objectionable if slightly more or moderately fewer than exactly two such sites appear on any individual molecule.

In other procedures, a starting aromatic compound can initially carry aromatic hydroxyl groups at sites of subsequent reaction.

Such material can be condensed with an aliphatic cyano compound, in routine cyanoalkylation, to obtain, at the former hydroxyl sites, cyano alkyl ether structures that are then ready, as cyano compounds in general are, for further use in this invention.

In another procedure, chloromethylated styrene is caused to react with hydrogen sulfide, or with a dimercaptoalkane or the like, under free radical reaction conditions, such as are provided by the use of 2,2'-azobis(2-methylpropionitrile) as catalyst, a material which is often simply designated AIBN. Such reaction produces the saturated adduct, for example, bis(chloromethylphenylethyl) sulfide. Of such structure and related structures, the chloromethyl site reacts readily with potassium cyanide to obtain the corresponding bis-cyanomethyl compound from which oxazine-oxazoline derivatives are readily prepared.

Aliphatic oxazoline-bearing structures are equally readily prepared. Acrylonitrile is immediately available and is representative, as are the large number of other aliphatic cyano compounds. Reaction of the double bond with hydrogen sulfide or water obtains the saturated bis(2-cyanoethyl) sulfide or ether, which can be used to obtain a dioxazine or oxazoline.

In another procedure, oxetane can be reacted with hydrogen cyanide to obtain 3-cyano-1-propanol which can be etherified in the presence of dehydrating agent such as sulfuric acid to obtain the bis(3,3'-cyanopropyl) ether.

From the cyano compound which in some structures can be classified as a nitrile, various routes to the instant oxazoline or oxazine structures are available. Each involves a first acyclic substitution at the cyano sites followed by a cyclizing reaction. Whether the resulting heterocycle is an oxazoline (five-membered) or oxazine (six-membered) ring will be determined by the chain length and structure of the acyclic substituent and is in each case entirely optional with the synthesis chemist. In many applications where the sole criterion to be met is that according to this invention there be provided a superior curing agent for an epoxy resin or a superior co-monomer, mixtures of oxazolines and oxazines will be as satisfactory as, or in some applications, more satisfactory than, compounds of high individual purity.

The most forthright route, procedurally, involves reactions of a mechanism which, when set out in detail, appears complicated; but procedures remain simple. This route involves causing a reaction of the cyano compound precursor with a lower alkylene chlorohydrin in the presence of hydrogen chloride, and upon the completion of that reaction, cyclizing the resulting intermediate with a substance, usually a base, which is an acceptor for the elements of hydrogen halide, such as triethylamine, trimethylamine, or an alkali metal hydroxide. With ethylene chlorohydrin (2-chloroethanol) this procedure leads to the oxazolines while with trimethylene chlorohydrin (3-chloro-1-propanol) it leads to the oxazines; and with a mixture of chlorohydrins, a mixture of heterocycles.

Alternative to the foregoing, yet starting from the cyano structure, a group of related synthetic routes proceeds by a first oxidation of the cyano to the carboxyl, as in the presence of sulfuric acid and under protonating conditions. Upon completion of the conversion to the carboxyl form, the resulting intermediate is then converted to the acyl halide, such as the chloride; in one convenient method this conversion is brought about by reaction of the carboxyl compound with thionyl chloride. Acyl halides other than the chloride are available; and can be used.

From the acyl halide form, various optional routes proceed. The acyl chloride reacts readily with aziridine (ethyleneimine) to obtain an intermediate which, in turn, in the presence of basic hydrogen chloride acceptor, cyclizes to the desired oxazoline structure.

Similarly, azetidines are used. The unsubstituted material is not well known to the present inventors, but numerous azetidines in which the heterocyclic ring has been stabilized by substituents give good results. In general, substituents on the carbon atoms of azetidines appear in the final oxazine products as substituents upon the corresponding carbon atoms.

From the acyl halide, another synthetic route requires reaction of the acyl halide with an amino alcohol, to produce an acyclic intermediate which, from the amino alcohol, is hydroxyl terminated and which, under moderate conditions of dehydration, gives the desired cyclic compound. The identity of the cyclic compound is determined by the number of linear carbon atoms between the hydroxyl and the amino groups. If two, the product is an oxazoline. If three, the product is an oxazine; if a mixture, a mixed product results.

The foregoing represent the prime synthetic routes to substances of the instant invention. A few secondary routes are appropriate to be stated.

From vinyloxazoline or vinyloxazine by reaction with a sulfhydryl compound, usually an aliphatic sulfhydryl compound, an adduct is formed. Thus, two moles of vinyl oxazoline with one mole of hydrogen sulfide yield a bis(oxazolinylethyl) sulfide. Similarly, by choice of other unsaturated oxazoline compounds, adducts of a wide variety are formed. Routinely, such reactions will be catalyzed by use of free radical catalysts.

The remarks foregoing concerning the reactions of sulfhydryl compounds with vinyloxazoline pertain equally to vinyloxazine and to oxazine-oxazoline mixtures. The vinyloxazine is readily prepared from acrylonitrile by reaction with 3-aminopropanol-1 to obtain an intermediate and thereafter, by dehydration as with sulfuric acid, cyclizing the intermediate.

The cyclizing reactions in which precursor substances are converted into the oxazoline compounds of the present invention are, in general exothermic and, in general, they do not require extreme conditions to be initiated. As such cyclizing reactions go forward, there is at least some tendency for competing reactions to take place in which, in a manner that has not been fully studied, polymeric substances appear to be formed. Such polymeric substances tend to be gummy or weakly resinous substances and of no presently recognized value, and are not desired. Higher temperatures favor the production of such polymeric substances, and, accordingly, it will oftentimes be desired to maintain reaction temperatures as low as is convenient. Accordingly, the addition of cyclizing agent will oftentimes be carried out slowly, portionwise, and with the resulting reaction mixture cooled or chilled.

Good results are usually obtained when the cyclizing reaction according to the present invention is carried out at a temperature between −30°C and +40°C. Within this range, at or beyond the lower limit, the cyclizing reaction goes forward very slowly; above the upper limit competing and probably polymerizing reactions go forward at such rate as to be wasteful. A preferred temperature range will vary somewhat according to the precise identity of the precursor substance to be cyclized and also according to the identity of the cyclizing agent; but, in general, a cyclizing reaction temperature of 0° to +10°C. will be preferred. When such temperatures are employed, however, it may at times be advantageous to drive the last aspects of the reaction to completion by the application of moderate heat or at least the removal of cooling for a terminal interval of reaction time.

The reaction can be carried out in the absence of liquid reaction medium. However, there is considerable tendency for employed materials, especially very pure materials, to crystallize; in this condition, the orderly procedure of the cyclizing reaction may be inhibited, and it will usually be desired to prevent or diminish crystallization by the addition of some liquid solvent that is inert to the reaction that is taking place, whereby to maintain an entire reaction mixture in the liquid phase until reactions are substantially complete. Solvent can be chosen for such volatility that it is thereafter readily stripped away.

The precise relationship between the amount of reactant to be cyclized and the capacity of the vessel in which cyclization is carried out is not critical. In general, the inventory of starting material and the capacity of the vessel in which cyclization is to be carried out should be such that good, thorough, prompt, and complete agitation, such as stirring, is convenient.

In general, the atmosphere within the vessel in which cyclization takes place is not critical and may be air. It may also be air saturated with vapors of a volatile solvent. When cyclodehydrohalogenating, as in the instance of a chloroalkylamide or chloroalkylamidate skilled chemists will at once recognize that the ambient atmosphere must not be richly supplied with hydrogen halide from outside source, since it would compete in the cyclizing reaction.

The starting amide or amidate compound to be cyclized can be obtained as an article of commerce and supplied as an existing entity to the reaction vessel. Alternatively, and conveniently, when desired, the starting material that is to be cyclized can be prepared in the same vessel in which it is subsequently cyclized, such preparation taking place immediately or shortly prior to the cyclization reaction if desired. The reaction conditions necessary to prepare the chloroalkylamide or amidate or the hydroxyalkylamide are closely similar to those employed in the cyclization, and such in situ preparation may be preferred.

Upon the completion of the synthesis of compounds according to this invention, work-up, that is to say, the separation and sufficient purification of the resulting products is not difficult. Most advantageous procedures will be determined upon the basis of the exact preparatory procedures observed. Thus, when hydrogen halide acceptor reacting with the elements of hydrogen halide obtains a water-soluble product, the entire reaction vessel contents can be, if desired, mixed with water and thoroughly stirred to wash the reaction vessel contents; typically, the resulting mixture separates promptly into an aqueous and an organic layer, product being predominantly in the organic layer.

Distillation can be employed to separate and purify product according to this invention, and the bulk of material necessary to be distilled can sometimes be reduced by such prior water washing.

Crude or partially purified product sometimes gives evidence that the desired product of the invention is a solid. In such instance, vacuum distillation is often of use in purification of product; but also, it is at times useful to take crude product up in and recrystallize it from solvent. At least in laboratory quantities, ordinary solvents give good results, such as a mixture of four parts diethyl ether and one part acetone by volume. Isopropanol is also at times used with good results to obtain a recrystallized solid product.

THE USES OF THE PRESENT INVENTION

The bioxazoline or bioxazine compounds of this invention homopolymerize under protonic catalytic influence to give self polymers that are useful as plastics. Any of various catalysts can be used. One convenient and very effective catalyst is the boron trifluoride adduct of the monomer. A monomer of this invention usually takes up boron trifluoride in quantity sufficient that it can be used in very dilute form with unmodified monomer to catalyze the polymerization. When a 1:1 molar $BF_3$-monomer adduct is formed, as is often the case, one mole percent of it in a mixture to be polymerized is usually sufficient to catalyze the polymerization. It can, if desired, be prepared in situ by passing gaseous $BF_3$ over the surface of a stirred monomer composition. If prepared other than in situ, it is to be maintained dry and out of contact with oxygen.

The catalyzed bioxazoline compound or mixture of such compounds polymerizes promptly upon being heated. The resulting polymers, absent plasticizing agents, are glassy, hard, and of color represented by that of the unpolymerized material. They are highly crosslinked and manifest the thermoset and insolubility properties characteristic of crosslinked polymers.

In another embodiment, a mono-oxazoline compound of the prior art (see Tomalia et al., cited above) is mixed in, as comonomer, with a crosslinking proportion of a bioxazoline or bioxazine compound of this invention, and the resulting mixture is catalyzed, as above, and heated to obtain a copolymer of the oxazoline and bioxazoline compounds. The relative abundance of the two kinds of monomer is adjusted to give a product of desired extent of crosslinking. Manipulative procedures are as those set forth above for the homopolymers.

Each embodiment of the foregoing described products of the present invention is useful as a reactive curing agent to cure a curable polyepoxide to obtain an epoxy resin. In this use, it is not necessary to produce the products of this invention with a high degree of purity in such matters as position isomery; or whether highly purified oxazines or oxazolines. Mixed products of this invention together with modest amounts of naturally occuring side products are of value and in some instances may be preferred, in the curing of polyepoxides.

For such use, the present diheterocyclic compounds bring the extraordinary advantage that, though highly effective as co-reactive curing agents, they can be mixed with the curable polyepoxide in advance and left together with it over prolonged periods of time, without cure of the epoxy. At refrigerator temperatures, latency of a year is available. At room temperatures that latency may be cut to a half year, at warehouse temperature in a hot climate, satisfactory latency may be a matter of weeks.

For one embodiment of such application, the amount of oxazine or oxazoline compound to be employed is calculated upon the basis that, in the curing reaction, one oxazine or oxazoline ring can react with one oxirane ring, and the reactants are to be supplied in quantities such that about this relative proportion of the substances is supplied. Good results are obtained when polyepoxide is supplied in stoichiometric amount or in an amount in modest excess of that required for exact stoichiometric cure.

When either or both materials are liquids or are viscous materials of viscosity low enough to admit, a curable mixture can be prepared by combining the polyepoxide and the diheterocyclic compound of this invention and mixing them intimately together. When viscosities are too great, or either or both substances are solids, they can be warmed to temperatures approaching 75°C or a little higher without risk of initiating untimely cure when the products are combined. However, temperatures at or very much above 100°C are to be avoided.

In order to combine intimately a polyepoxide and a diheterocyclic compound of this invention when the substances employed are in physical form that does not readily admit of mixing them, it will usually be preferred to dissolve one or both first in a volatile solvent, and to combine the solvent solution with either of the other of the reactants or with its solvent solution, and, if solvent present is objectionable, subsequently volatilize and remove solvent as by distillation. In another procedure, a known reactive viscosity lowering additive such as butyl glycidyl ether or phenyl glycidyl ether is added to either or both of the reactants, in any quantity necessary to reduce viscosity to the point that the diluted substances can be mixed together. In some applications the resins cured from precursors containing a reactive diluent are of inferior properties. Those skilled in the art will be able to effect the combining of the reactants according to this invention satisfactorily.

The diheterocyclic compounds of the present invention are useful as pesticides in the control of various pests of agricultural and horticultural plants and animals of economic importance. In more particular, the compounds are, at various rates, larvicides for the control of insects having aquatic at least larval phases, they are useful for the control of parasitic fungi, and in particular for fungistasis on plant leaves; they are of value in the preservation of wood from deterioration and degradation through the vital processes of fungi, and they are selective herbicides for the control of green plants.

To avail of such use, a compound of this invention can be dispersed on or in an inert finely divided solid with or without the aid of a solvent or dispersing agent and employed as a dust. Also, such preparation can be dispersed in water with or without the aid of a wetting agent and the resulting aqueous suspension employed as a spray or wash. In other procedures, the product can be employed in oil, or as a toxic and active constituent of an oil-in-water or water-in-oil emulsion or as an aqueous dispersion thereof which may be applied as spray or drench. In a representative operation, the application to run-off of an aqueous dispersion containing 400 parts of 2,2'-(thiodiethylene)bis-2-oxazoline to young and vigorously growing tomato plants which were thereafter heavily innoculated with viable spores of tomato late blight and maintained subsequently under environmental conditions favorable for the growth of the late blight fungus showed a 75 percent control of the development of the fungus as compared with a similar group of similar plants similarly treated except that no application was made of the fungicidal dioxazoline compound of this invention.

The present invention, then, comprehends mixtures of polyepoxide curable to obtain an epoxy resin with heterocyclic compound of this invention with polyepoxide present in a relative abundance from about 100 to about 150 percent, equivalent. In such mixtures in which the polyepoxide is more abundant, the adduct of heterocycle and oxirane hitherto noted as of catalytic activity in curing an epoxide performs that function to cure the polyepoxide catalytically, with co-reaction of the instant polyheterocyclic products whereby they become integral moieties of the resulting polymer.

Excellent results have been achieved when employing equivalent quantities of polyepoxide and bisoxazine or oxazoline product of this invention.

EXAMPLE 1

Synthesis of the Dihydrochloride of the Bis(2-chloroethyl) Ester of 3,3'-Oxydipropionamidic Acid The subject compound synthesized according to this example is representative of a cyclizable precursor chloroalkylamidate compound.

In a one liter round bottomed flask with various access openings, and in an exhaust hood, 124 grams (1.0 gram mole) of 3,3'-oxydipropionitrile is combined with 161 grams (2.0 gram mole) ethylene chlorohydrin and also with 200 milliliters dry dichloromethane as solvent, and the resulting solution is chilled to a temperature between 0° and 5°C. The 3,3'-oxydipropionitrile compound, as well as other such preliminary starting substances to be used according to the present invention, is found at 65 Journal of the American Chemical Society 23 (26) (1934) where it is called bis($\beta$-cyanoethyl)ether. The compound boils at 120°C under 1 millimeter pressure and has a refractive index $n$ for the D line of sodium light at 25°C of 1.4392.

With the mixture above described maintained at near the freezing temperature of water, dry gaseous hydrogen chloride is introduced through a sparger over a period of time until weight gain of the flask indicates that 170 grams of hydrogen chloride has been, in some way, taken up. Stirring and chilling at 0°–5°C are continued overnight, approximately 15 hours, and at the end of this time the mixture is modified by the addition of 400 milliliters more of anhydrous dichloromethane, which is added to assure that separation out of any organic material in crystalline form is prevented by the presence of abundant solvent. In this condition, then atmospheric pressure within the flask and above the reacted mixture is reduced to approximately 20 to 30 millimeters mercury absolute, for about an hour, to draw off any uncombined hydrogen chloride possible, and in the process an undetermined amount of dichloromethane is also removed. At the end of this hour, 200 milliliters further anhydrous dichloromethane are added and the reaction mixture then again placed under substantially the same subatmospheric pressure as had previously been employed, and the temperature elevated to and maintained for one hour at approximately 35°, to facilitate further removal of hydrogen chloride.

The presence of hydrogen chloride at this point is not seriously adverse except that, in subsequent stages of the reaction according to the present invention, it consumes reactants wastefully and complicates the work-up purification of product. No more convenient opportunity is usually afforded for its removal than at this juncture.

Following the 35° vacuum treatment, the resulting solution contains the desired dihydrochloride of the bis(2-chloroethyl)ester of 3,3'-oxydipropionamidic acid. If desired, it can be separated from solvent by distillation under anhydrous conditions. The product is actively labile in the presence of moisture which it has a strong tendency to pick up from air and the like; it can be used as a dehydrating agent and in a desiccator or dry box and the like to maintain anhydrous conditions. In such use the product is consumed. When it is desired to maintain the dihydrochloride ester in condition to be used to prepare the diheterocycles of this invention, conditions as nearly as possible strictly anhydrous are mandatory. When the indicated amidate salt is to be employed in solution, as will commonly be the case, it can be left in solution, as here, and stored in that situation advantageously.

EXAMPLE 2

Synthesis of the Dihydrochloride of the Bis(2-chloroethyl) Ester of 3,3'-Thiodipropionamidic Acid The instant compound, a starting material to be employed according to the present invention is prepared in substantially the same procedures as those described in Example 1, above, except that the starting nitrile is 3,3'-thiodipropionitrile, and the employed amount is 140 grams, 1 gram mole. Temperatures maintained, stirring, duration of reaction times, procedures for the removal of undesired hydrogen chloride and the like, are identical with those carried out for the preparation of the oxygen compound prepared according to Example 1. The product is similarly useful as a desiccating agent and similarly labile towards water and is, accordingly, to be maintained and employed under anhydrous conditions.

EXAMPLE 3

Synthesis of the Dihydrochloride of the Bis(2-chloroethyl) Ester of 4,4'-Oxydibenzamidic Acid The present example proceeds substantially identically with the procedures in Example 1 and 2 except that the starting nitrile is p,p'-oxybis(phenylacetonitrile), a tan solid melting at 53°–56°C; the employed amount is one half gram mole, namely, 124 grams; and, correspondingly, the amount of ethylene chlorohydrin is reduced to 80.5 grams, 1 gram mole; and, correspondingly, a smaller amount (79.5 grams; 2.2 gram moles) of hydrogen chloride is absorbed. Moreover, the oxybisphenylacetonitrile compound is not so readily soluble nor are its reaction products, as in the previous example, for which reason the amount of dichloromethane is increased somewhat, although the precise amount is, as is usual with solvent, optional. Presently, 620 milliliters are employed.

The product is similarly useful as a desiccating agent, similarly labile towards moisture, as were the products of Example 1 and 2, and, correspondingly, the product is kept under anhydrous conditions until employed in further syntheses of this invention.

EXAMPLE 4

Synthesis of p,p'-Oxybis(N-(2-chloroethyl)-benzamide

The instant compound is illustrative of the cyc-lizable chloroalkylamides.

In a 500 milliliter flask were mixed and combined together 29.5 grams, 0.1 gram mole, of p,p'-oxybis(bengoylchloride) in 250 milliliters of carbon tetrachloride. This solution was chilled to a temperature in the range of 0°–10°C, and, at that temperature, a solution of 0.2 gram moles, 8.6 grams, of aziridine in 100 milliliters carbon tetrachloride at room temperature was added dropwise, and with continuous vigorous stirring, during a period of 90 minutes.

During the addition of aziridine, a substantial amount of white solid product was formed in, and became separate from, the liquid components of the reaction mixture. The resulting reaction mixture was allowed to stand at room temperature overnight to carry to completion any reaction then taking place, and the following morning the resulting solid product was separated by filtration and dried. The p,p'-oxybis(N-(2-chloroethyl)benzamide) weighed 33 grams, representing a yield of 87 percent based on benzoyl chloride compound. A portion of the product was taken up in, and recrystallized from, isopropanol to obtain a sample of greater purity; this recrystallized sample was found to melt at 194°–197°C. The product was a starting material to be cyclodehydrohalogenated to obtain a product of the present invention.

EXAMPLE 5

Cyclodehydrohalogenation of the Dihydrochloride of the Bis(2-chloroethyl) Ester of 3,3'-Oxydipropionamidic Acid The material to be cyclodehydrohalogenated according to the present invention is the product of Example 1. It can be employed in the reaction mixture in which; as in Example 1, it is prepared, in anhydrous dichloromethane from which excess hydrogen chloride has been withdrawn by maintaining the solution under vacuum and at approximately room temperature. Oftentimes, this will be the most advantageous route because it avoids the problem of separating and storing the starting intermediate material under anhydrous conditions. However, the starting material can be separated and stored under anhydrous conditions and subsequently brought to employment according to the instant example. The starting material can be obtained from any source.

The starting propionamidic acid compound, as named in the headnote of this example, dispersed in substantially anhydrous solvent which is inert under employed conditions and can be dichloromethane, and maintained under substantially anhydrous conditions, is cooled to a temperature of approximately 0°–5°C (in the preferred embodiments of this invention, although, outside the preferred embodiments, temperatures of a substantially wider range are available and the instance while cyclodehydrohalogenating agent triethylamine, in this case, is added dropwise over a period of 1 hour. In theinstance of the present starting material, the yield from the reaction of an original 124 grams oxydipropionitrile with 161 grams ethylene chlorohydrin is cyclodehydrohalogenated by the addition, dropwise, and with stirring and continued cooling, of 444 grams, 4.4 gram moles, of triethylamine. While triethylamine is here the preferred cyclodehydrohalogenating agent, others known in the art for such use are available. Characteristically, such agents are basic acceptors of hydrogen halide.

After the completion of the addition of triethylamine, the resulting mixture is permitted to warm to room temperature and is then slowly heated to a temperature in the range of 35°–40°C for 4 hours, to carry the cyclodehydrohalogenation to completion, and thereafter poured into 1,500 milliliters of water.

The resulting separation is imperfect but good, and useful. The aqueous layer dissolves and makes possible separation of most of the hydrohalide salt of, for example, triethylamine; while the organic layer predominantly holds much of the 2,2'-(oxydiethylene)bis-2-oxazoline product resulting from the cyclizing according to the present invention. However, the oxazoline product is somewhat soluble in water whereas the triethylamine hydrochloride and other substances present are somewhat soluble in organic solvents, with the result that the separation is neither perfect nor free from some waste. It is, nevertheless, under ordinary laboratory procedures, a preferred method according to this invention. Other procedures, such as distillation, are available under industrial conditions.

The organic layer is separated from the aqueous layer, the aqueous layer discarded (although it can be washed, or washed repeatedly, by the use of an organic solvent that is immiscible in water, to scrub further portions of product from it). The organic layer, together with scrubbing solvent, if employed, is concentrated by warming under vacuum to remove portions of solvent, and, by these procedures, there are obtained 155.6 grams of crude product, a yield of 74 percent as related back to the amount of employed starting 3,3'-oxydipropionitrile.

The crude product is distilled in a high vacuum still, to obtain a yield of 110 grams (52 percent) of a light yellow liquid boiling at 95° under a pressure of $1.2 \times 10^{-4}$ millimeters mercury, absolute. The resulting product is examined as to infrared spectrum and nuclear magnetic resonance spectrum. In both instances, the resulting spectra are harmonious with the assigned structure. For example, in the infrared spectrum, there is observed a —C=N— stretch band at around 1,680 reciprocal centimeters.

The product was analyzed for contents of carbon, hydrogen, and nitrogen, and found to contain 56.7, 7.99, and 13.2 percent of these elements, respectively; these figures can be compared with theoretical values of 56.6, 7.55, and 13.2 respectively. The product was a light yellow liquid.

EXAMPLE 6

Cyclodehydrohalogenation of the Dihydrochloride of the Bis(2-chloroethyl) Ester of 3,3'-Thiodipropionamidic Acid The material to be cyclodehydrohalogenated according to the present invention is the product of Example 2, foregoing. It can be employed in the reaction mixture in which, as in Example 2, it was prepared, in anhydrous dichloromethane from which excess hydrogen chloride is withdrawn by maintaining the solution under vacuum and at approximately room temperature. Alternatively, the starting material can be from any source, stored under anhydrous conditions, and subsequently brought to employment according to this example. The former route is here employed, and approximately one gram mole of the ester hydrochloride is present.

The starting dihydrochloride of the bis(2-chloroethyl) ester of 3,3'-thiodipropionamidic acid, dispersed in substantially anhydrous inert solvent which can be dichloromethane, carbon tetrachloride, 1,1,1-trichloroethane, benzene, toluene, and the like, or a mixture of them, is maintained under substantially anhydrous conditions, cooled to a temperature of approximately 0°-5°C; and, in this situation cyclodehydrohalogenating agent is added dropwise over a period of about an hour. The resulting reaction mixture is vigorously stirred during the addition period, and a solid reaction product is formed in, and appears in and distinct from, the other components of the reaction mixture.

In the instant example, the cyclodehvdrohalogenating agent is triethylamine, and 4.4 moles, 444 grams of it are employed. This amount is sufficient to accept hydrogen chloride from the salt form in which the cyclizable material exists, and from the chloroethyl ester moieties, to both neutralize and cyclize the substance.

Upon completion of the addition of the triethylamine, the resulting reaction mixture is permitted to stand for several hours at the reaction temperature, with stirring, to carry the cyclodehydrohalogenation to completion.

Thereafter, the resulting mixture is filtered, and the residue retained and washed on filter paper, and removed therefrom to obtain 202.1 grams of product, 89 percent by weight, based upon starting nitrile compound from which the thiodipropionamidic ester was prepared.

This product is distilled in high vacuum to obtain 117 grams (52 percent by weight of starting material of 2,2'-(thiodiethylene)bis-2-oxazoline product as a light yellow liquid boiling at 102°-104°C under a pressure of $1.4 \times 10^{-4}$ millimeters mercury, absolute. The product is examined by infrared and nuclear magnetic resonance spectra and the spectra found to be consistent with the assigned structure. A —C=N— stretching band is observed at 1,675 reciprocal centimeters. The displacement of 5 reciprocal centimeters from the position of substantially the same stretching band in the previous example is regarded as correct in view of the greater mass of the sulfur which is attached through a methylene group to the carbon of the group of which the stretching band was previously observed.

The product is analyzed for contents of carbon, hydrogen, nitrogen and sulfur and found to contain 52.5, 6.81, 12.59 and 14.00 weight percent of these elements, respectively, as compared with theoretical values of 52.5, 7.00, 12.30, and 14.0, respectively.

7

Preparation of 2,2'-(Oxybis(p-phenylenemethylene))Bis-)Bis-2-oxazoline by Cyclodehydrohalogenation of the Dihydrochloride of the Bis(2-chloroethyl)Ester of 4,4'-Oxydibenzamidic Acid The starting dihydrochloride of the ester of benzamidic acid employed as starting material in the instant example is the product of Example 3, herein, foregoing. The starting dihydrochloride of the bis(2-chloroethyl)ester of 4,4'-oxydibenzamidic acid is dispersed with stirring in dichloromethane as solvent, employing approximately 600 milliliters thereof. The mixture is chilled to a temperature in the range of 0°-5 °C, and at this temperature 220 grams (2.18 moles) triethylamine are added dropwise, slowly, and with continuous stirring over a period of 3 hours. Upon completion of the addition of triethylamine reactant, the resulting reaction mixture in its flask is placed over an electric heating mantle equipped with thermostat control; a reflux condenser is attached to the flask, and the mixture is heated at the reflux temperature for 4 hours to drive the dehydrohalogenation reaction to completion. At the end of this time, the resulting mixture is filtered to separate and remove precipitate of triethylamine hydrochloride; the crude hydrochloride material is found to weigh 271.5 grams, constituting approximately 1.99 gram moles of material.

After this filtration, the filtrate is distilled under atmospheric pressure through a 3 foot by ½ inch Vigreux column, with heating being continued until a pot temperature of 70° is attained. Under these conditions, substantial amounts of solvent are vaporized and separated. Further removal of solvent is accomplished by placing the flask under vacuum at room temperature overnight, during which the pot contents solidify. The resulting solid is maintained under vacuum for a further period of time to vaporize and remove further trace portions of solvent. Thereafter, the solid is removed from the flask and found to weigh 107 grams, constituting a yield of approximately 65 percent of 2,2'-(oxybis(p-phenylenemethylene))bis-2-oxazoline based upon starting p,p'-oxybis(phenylacetonitrile); in this condition the product melted over the range of 76°-86 °C.

A portion of the sample was taken up in, and recrystallized from, a mixture of 100 milliliters diethyl ether and 25 milliliters acetone, to obtain 3.5 grams of a white crystalline product material melting at 83.5°-87 °C.

The product is scrutinized by infrared and nuclear magnetic resonance spectrum techniques and found to exhibit a spectrum characteristic of the assigned structure. The infrared spectrum manifests, among other features, an absorption characteristic charactertistic of the —C=N— structure at 1675 reciprocal centimeters. The nuclear magnetic resonance spectrum presents a sharp singlet at −3.5 ppm., representing a methylene structure; a multiplet at −3.75 to −4.45 ppm., representing oxazoline ring protons, and a multiplet at −6.85 to −7.35 ppm., representing aromatic protons; these features in the ratio of 1:2:2. The product is analyzed for carbon, hydrogen, and nitrogen and found to contain 71.0, 6.08, and 8.13 weight percent respectively of these elements as compared with theoretical values of 71.5, 5.95, and 8.32, respectively.

EXAMPLE 8

Cyclodehydrohalogenation of p,p'-Oxybis(N-(2-chloroethyl)-benzamide)

The material to be cyclodehydrohalogenated according to the present invention is the product of Example 4. It can be employed in the reaction mixture in which, as in Example 4, it is prepared, in anhydrous carbon tetrachloride, or the starting material can be brought from any source to the reaction according to the instant example. The cyclodehydrohalogenating agent is potassium hydroxide.

A solution of potassium hydroxide in absolute methanol is prepared, of normal strength. Of this solution, 150 milliliters are placed in a 500 milliliter flask and stirring is begun. Thereto, with continued stirring, are added 28 grams (0.075 gram mole) of p,p'-oxybis(N-(2-chloroethyl)-benzamide) to obtain a slurry.

With continued stirring, the resulting slurry is heated to the boiling temperature under reflux and maintained thereat for 4 hours. In the resulting cyclodehydrohalogenation, potassium hydroxide is converted to potassium chloride with release of the elements of water and the desired 2,2'-(oxydi-p-phenylene)bis-2-oxazoline product is formed. The reaction mixture is thereafter permitted to cool to room temperature and is filtered, and the potassium chloride residue discarded. The resulting alcoholic product solution is then diluted with 300 milliliters water to throw the desired product out of solution and the resulting slurry is again filtered. As a result of these procedures, there is obtained 13 grams of a white solid which melts over the temperature range of 168°–176 °C. A portion of the white product solid is taken up in hot isopropanol and recrystallized therefrom by cooling to obtain a purified 2,2'-(oxydi-p-phenylene)bis-2-oxazoline product melting at 170°–174°C. The structure was confirmed by infrared spectrum and nuclear magnetic resonance, both of which gave inflections appropriate for the assigned structure. The product was analyzed for contents of carbon, hydrogen, and nitrogen and found to contain 56.45, 4.64, 7.65 percent of these elements, respectively, by weight of total compound as compared with theoretical values of 56.60, 4.72 and 7.35 also, respectively.

We claim:

1. 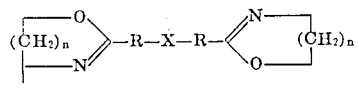

wherein R is alkylene, phenylene, phenylenealkylene with phenylene bonded to X, wherein, alone or combined, "alkylene" designates a moiety of from one to 10, both inclusive, carbon atoms, X designates oxygen or sulfur, and $n$ is a common integer of zero or 1.

2. 2,2'-Oxydiethylenebis-2-oxazoline.

3. 2,2'-Thiodiethylenebis-2-oxazoline.

4. 2,2'-Oxybis(p-phenylenemethylene) bis-2-oxazoline.

5. 2,2'-(Oxydi-p-phenylene) bis-2-oxazoline.

* * * * *